United States Patent [19]

Pesce

[11] 4,225,655
[45] Sep. 30, 1980

[54] WATERTIGHT BATTERY BOX

[76] Inventor: Louis Pesce, 1311 W. Webster Ave., Winter Park, Fla. 32789

[21] Appl. No.: 28,923

[22] Filed: Apr. 10, 1979

[51] Int. Cl.³ ............................................ H01M 2/10
[52] U.S. Cl. ..................................... 429/100; 429/6; 206/811; 220/8
[58] Field of Search ....................... 429/6, 96, 99, 100, 429/163, 175, 176, 65; 174/17 GF, 17.06, 17.07; 220/8, 228, 352, 356; 206/811

[56] References Cited

FOREIGN PATENT DOCUMENTS 1239652 7/1971 United Kingdom ...................... 429/6

Primary Examiner—Donald L. Walton
Attorney, Agent, or Firm—Young & Thompson

[57] ABSTRACT

A watertight battery box comprises an upwardly open base and a downwardly open lid which rests on the upper edges of the base. One edge of the base has a recess therein for receiving the battery cables, and the lid has a downwardly opening channel therein for receiving the cables. In use, water can rise around the battery box without entering the battery box, because the lid traps air beneath itself but has little or no buoyancy.

4 Claims, 3 Drawing Figures

WATERTIGHT BATTERY BOX

The present invention relates to a waterproof battery box, and more particularly to a battery box which protects a contained battery against water which may rise around the battery box.

The present invention is thus of particular utility in boats, in which the battery may be partially or totally submerged when the boat swamps or when a heavy rain occurs, or when the boat leaks or ships water, and in other emergency situations. Should the battery itself become immersed, the water, and particularly salt water, tends to short the battery terminals, with total loss of battery power. Especially in an emergency situation, loss of battery power is intolerable, because the ship's lights, radio, engine starter and other vital electrically powered equipment cannot be used.

It is accordingly an object of the present invention to provide a watertight battery box, which will keep the battery dry even when fully submerged.

Another object of the present invention is the provision of a watertight battery box the components of which have little or no buoyancy and hence substantially no tendency to float away when submerged.

Finally, it is an object of the present invention to provide a watertight battery box which will be simple and inexpensive to maufacture, easy to manipulate, and rugged and durable in use.

Other objects, features and advantages of the present invention will become apparent from a consideration of the following description, taken in connection with the accompanying drawing, in which.

Figure 2:
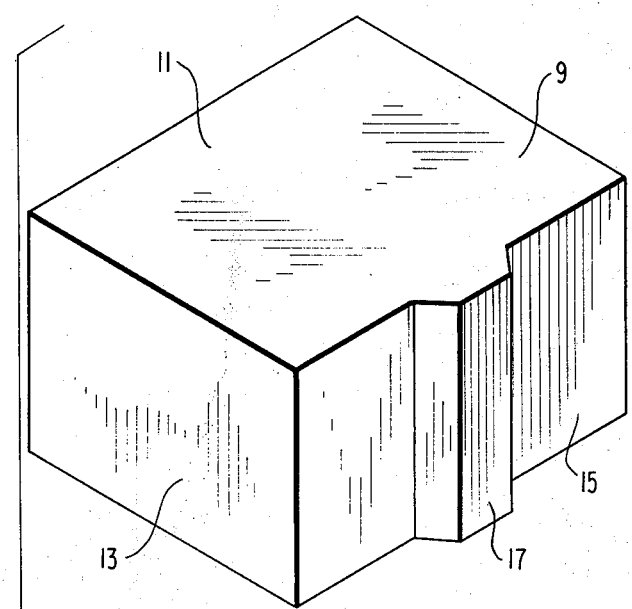
FIG. 2 is a side elevational view of a closed watertight battery box according to the invention, with the battery inside.
Figure 2:
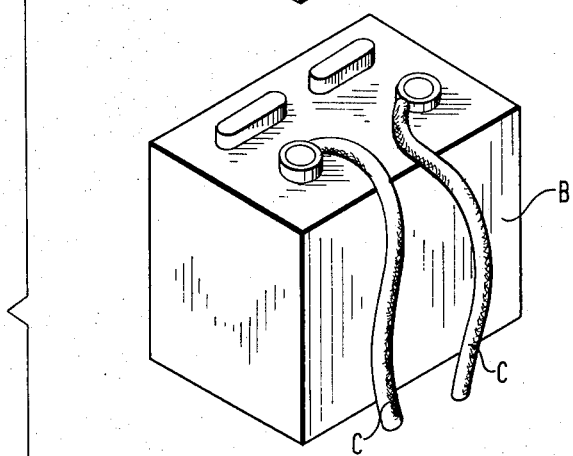
Figure 2:
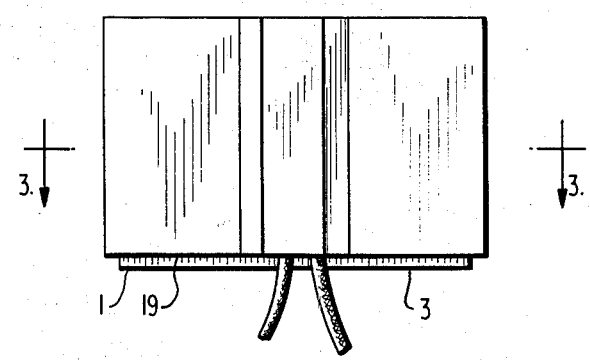

Referring now to the drawing in greater detail, there is shown a watertight battery box according to the present invention, comprising a base 1 which is of parallelepipedal overall configuration and watertight construction and is upwardly open, comprising a closed bottom 3 from which four walls upstand and terminate in upper edges 5 disposed in a common horizontal plane. One of the side walls of the base, which can arbitrarily be regarded as the front wall of the base, is provided with an upwardly opening recess 7 in the upper edge 5 thereof, centrally of its length.

The other half of the battery box comprises a watertight cover 9 comprised by a closed upper wall 11 from which depend side walls 13 and a rear wall and what may arbitrarily be regarded as a front wall 15.

Integral with front wall 15 is a vertical, elongated, inwardly-opening channel 17, closed at its upper end but open at its lower end. Channel 17 may have any desired cross-sectional configuration, which is preferably uniform from top to bottom thereof, and may for example be rounded or polygonal. Channel 17 may also be in the form of two subchannels, disposed side-by-side on front wall 15, or with one on the front wall and the other on the rear wall.

Figure 3:
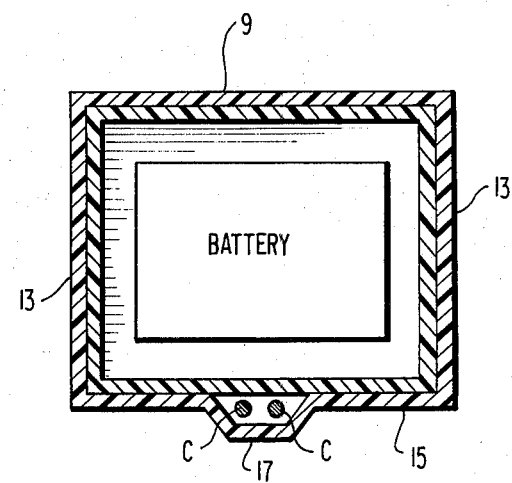
FIG. 3 is a cross-sectional view taken on the line 3—3 of FIG. 2.

Base 1 and cover 9 are preferably of plastic or other waterproof electrically insulating material, each being of one-piece molded construction. As best seen in FIG. 3, they preferably interfit rather snugly, for a reason that will appear hereinafter.

Figure 1:
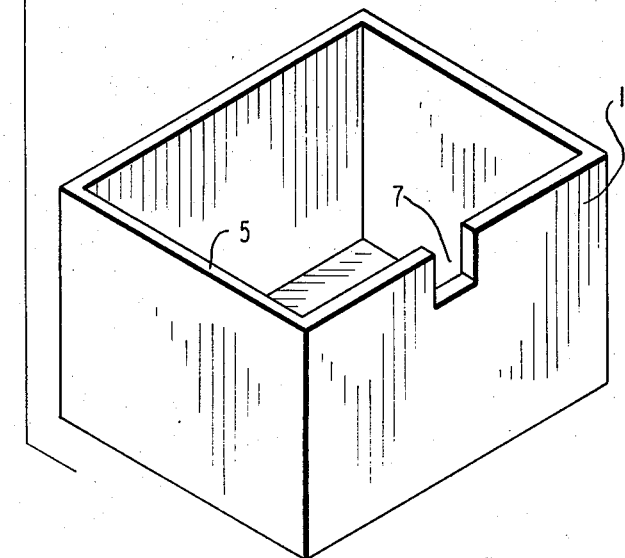
FIG. 1 is an exploded perspective view of a battery and watertight battery box according to the present invention.

In use, the components of the present invention are assembled as suggested in FIG. 1: the base 1 is placed with its open top uppermost, and then a battery B, which may be any conventional battery such as a marine battery for powering the electrical system of a boat, is lowered into base 1. Battery B need not fit snugly within base 1, because the weight of battery B will in any event be enough to prevent base 1 from floating away even when fully submerged. Obviously, however, base 1 should not be much larger than battery B, so as to save space and material. Upper edge 5 of base 1 will extend a short distance above the terminals and other structure on the top of battery B, when battery B is fully lowered into base 1.

In the assembled position of battery B and base 1, the conventional battery cables C from the positive and negative terminals of the battery, will extend through recess 7, entirely below the top of the recess, and thence downwardly.

Cover 9 is then applied by sliding it on over base 1 which now contains battery B, until the underside of top wall 11 rests on upper edges 5 of base 1 and is then spaced a short distance above any structure on battery B. Channel 17 is in alignment with recess 7 in the assembled condition, and so receives and contains within it the cables C between the interior of channel 17 and the front wall of base 1, as best seen in FIG. 3.

As shown in FIG. 2, the lower edge 19 of cover 9 does not extend down as far as the underside of bottom 3 of base 1. Thus, when base 1 is resting on a flat horizontal surface, as is ordinarily the case, lower edge 19 will be spaced above that surface. The reason for this is that it permits the cables C to run out freely from beneath cover 9, without elevating or tilting cover 9 relative to base 1. Of course, the bottom of recess 7 is a substantial distance above lower edge 19 of cover 9 when cover 9 is in place.

It will therefore be apparent that, with the parts in the assembled position of FIGS. 2 and 3, rising water cannot enter the battery box of the present invention. The cover 9 in effect constitutes a dome which traps a body of air beneath it. However, almost all of the space beneath cover 9 will be occupied by base 1, so that cover 9 will have substantially only its own buoyancy and that of the interior of channel 17. Ordinarily, the mere weight of cover 9 will be ample to overcome this buoyancy, so that there will be no tendency whatsoever for cover 9 to float away even when fully submerged. It is for this reason that it is preferred that cover 9 be a rather close sliding fit on base 1.

Of course, base 1 will have the buoyancy of any upwardly open vessel. But almost all of base 1 will be occupied by battery B, which will ordinarily be quite heavy, of a weight ample to overcome the buoyancy of base 1.

Therefore, the battery box of the present invention, with a battery inside, will have substantially no buoyancy even when fully submerged; and so there is no need to weight cover 9 to prevent anything from floating away.

Also, it will be evident that water cannot rise within the watertight battery box much above the level of lower edge 19 of cover 9, and in any event not as high as the bottom of recess 7. Therefore, water will be completely excluded from base 1, and hence from any contact with battery B.

From a consideration of the foregoing disclosure, therefore, it will be evident that all of the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention, as defined by the appended claims.

What is claimed is:

1. A watertight battery box for receiving a battery having positive and negative terminals and a cable extending from each of said terminals, comprising an upwardly open base and a downwardly opening cover, the cover having a vertically extending inwardly opening channel on at least one side wall thereof, said at least one channel being closed at its top and open at its bottom to confine said cables between the interior of said at least one channel and at least one side wall of said base, said base and cover snugly interfitting with each other and the outer contour of said channel extending outwardly from the outer contour of said cover which is disposed on opposite sides of said channel.

2. A watertight battery box for receiving a battery having positive and negative terminals and a cable extending from each of said terminals, comprising an upwardly open base and a downwardly opening cover, the cover having a vertically extending inwardly opening channel on at least one side wall thereof, said at least one channel being closed at its top and open at its bottom to confine said cables between the interior of said at least one channel and at least one side wall of said base, said cover resting on the upper edges of said base, said at least one side wall of said base having at least one upwardly opening recess therein in registry with said at least one channel, for receiving said cables as they pass out of said base and into said at least one channel.

3. A watertight battery box for receiving a battery having positive and negative terminals and a cable extending from each of said terminals, comprising an upwardly open base and a downwardly opening cover, the cover having a vertically extending inwardly opening channel on at least one side wall thereof, said at least one channel being closed at its top and open at its bottom to confine said cables between the interior of said at least one channel and at least one side wall of said base, the lower end of said at least one channel terminating a short distance above the bottom of said base when said cover rests on said base, to permit said cables to leave said channel at an elevation above the elevation of the bottom of the base.

4. A watertight battery box for receiving a battery having positive and negative terminals and a cable extending from each of said terminals, comprising an upwardly open base and a downwardly opening cover, the cover having a vertically extending inwardly opening channel on at least one side wall thereof, said at least one channel being closed at its top and open at its bottom to confine said cables between the interior of said at least one channel and at least one side wall of said base, the cover having negative buoyancy in water when the cover is fully seated on the base, said base and cover snugly interfitting with each other and the outer contour of said channel extending outwardly from the outer contour of said cover which is disposed on opposite sides of said channel, said cover resting on the upper edges of said base, said at least one side wall of said base having at least one upwardly opening recess therein in registry with said at least one channel, for receiving said cables as they pass out of said base and into said at least one channel, the lower end of said at least one channel terminating a short distance above the bottom of said base when said cover rests on said base, to permit said cables to leave said channel at an elevation above the elevation of the bottom of the base.

* * * * *